Feb. 8, 1955 W. R. GILBERT 2,701,712

BRIGHT ANNEALING FURNACE

Filed March 19, 1952 4 Sheets-Sheet 1

INVENTOR.
Wesley R. Gilbert
BY Nathaniel Frucht
ATTORNEY

Feb. 8, 1955 W. R. GILBERT 2,701,712

BRIGHT ANNEALING FURNACE

Filed March 19, 1952

INVENTOR.
Wesley R. Gilbert

BY Nathaniel Frucht

ATTORNEY

Feb. 8, 1955 W. R. GILBERT 2,701,712

BRIGHT ANNEALING FURNACE

Filed March 19, 1952 4 Sheets-Sheet 3

INVENTOR.
Wesley R. Gilbert
BY
Nathaniel Frucht
ATTORNEY

Feb. 8, 1955 W. R. GILBERT 2,701,712

BRIGHT ANNEALING FURNACE

Filed March 19, 1952

INVENTOR.
Wesley R. Gilbert
BY Nathaniel Frucht
ATTORNEY

United States Patent Office 2,701,712

Patented Feb. 8, 1955

2,701,712

BRIGHT ANNEALING FURNACE

Wesley R. Gilbert, Cranston, R. I., assignor to C. I. Hayes, Inc., a corporation of Rhode Island Application March 19, 1952, Serial No. 277,418

1 Claim. (Cl. 266—5)

The present invention relates to the art of heat treating metals, and has particular reference to a novel bright annealing furnace construction.

The principal object of the invention is to provide a muffle-type heating furnace of novel construction for bright annealing stainless steel at high temperatures.

Another object of the invention is to provide a novel furnace construction for bright annealing stainless steel in a hydrogen atmosphere.

A further object of the invention is to provide a muffle-type furnace construction for bright annealing with relatively small volumes of hydrogen gas.

An additional object of the invention is to provide a muffle-type furnace utilizing hydrogen atmosphere with safety devices for preventing formation of explosive mixtures.

Still another object of the invention is to provide a heating furnace of the type described in which the hydrogen atmosphere creates pressure curtains to prevent flow of air into the heating chamber.

Another object of the invention is to provide means for cooling outgoing heat treated material below the ignition point of hydrogen air mixture.

A further object of the invention is to provide a novel muffle-type furnace construction with means for regulating and controlling flow of hydrogen to maintain a stabilized hydrogen atmosphere.

An additional object of the invention is to provide a novel muffle-type furnace construction having means for conveying work undergoing heat treatment in elevated relation to the muffle floor.

Still another object of the invention is to provide a high temperature muffle-type furnace with means for preventing warping of the floor wall of the muffle.

A further object of the invention is to provide a muffle-type furnace having an elevated heating chamber with a work conveyor belt ascending to the heating chamber and descending from the heating chamber.

Another object of the invention is to provide a muffle-type furnace having mechanism for reducing the tractive pull of the conveyor belt.

With the above and other objects and advantageous features in view, the invention consists of novel features of construction and a novel arrangement of parts more fully disclosed in the detailed description following, in conjunction with the accompanying drawings, and more specifically defined in the claims appended thereto.

It has been found desirable to provide a novel construction for a muffle-type heating furnace for bright annealing metals in general, especially stainless steel at high temperatures. To this end, I have devised a novel furnace construction and arrangement in which metal work is conveyed into an elevated muffle-type heating chamber by a metal alloy conveyor belt driven by a combination of puller and pusher means, hydrogen gas being introduced through a directional atmosphere injector in a pre-cooling section to form a hydrogen atmosphere which flows into and completely fills the muffle, the flow being regulated and controlled by means of escape plugs. The novel construction of the furnace includes means for creating a differential in the elevation of the hydrogen atmosphere to vary the rate of flow. The entrance to the ascending passageway is preferably lower than the exit of the descending passageway, whereby the cold hydrogen being introduced, being heavier than the hot hydrogen already in the muffle, flows to the forward end towards the entrance to the ascending passageway. This differential in elevation is also regulated by removable plugs located at the forward end of the ascending passageway and the rear end of the descending passageway in order to facilitate forward flow of hydrogen and to thereby maintain a cleansing atmosphere of hydrogen within the heating chamber at all times. In order to prevent warping of the floor of the muffle due to the introduction of cold work onto the hot metal floor, the floor of the muffle and the heating chamber is provided with alloy U-shaped platforms of high terminal capacity for elevating the work and preventing direct heat transfer from the muffle to the work.

A further safeguard against warping is provided by subjecting the forward end of the floor of the muffle to direct heating so as to supply increased heat at the portion of the heating chamber where the cold work enters. Flow of hydrogen atmosphere through the muffle is regulated by means of escape plugs located at different parts of the furnace, and prevention of a dangerous accumulation of explosive mixtures of hydrogen and air is accomplished by the elevated heating chamber and by passing the hot work through a series of cooling chambers at the rear end of the heating chamber to lower the temperature below the ignition point of an explosive mixture before the work passes through the rear of the furnace where seepage of outside air into the furnace may create a dangerous explosive mixture. Since it is desirable to convey the work into the heating chamber by means of an ascending conveyor belt, and to remove the work out of the heating chamber by means of a descending conveyor belt, an auxiliary drive means is employed on the ascending conveyor belt for the whole distance of the climb to reduce the pull due to traction.

Figure 1:
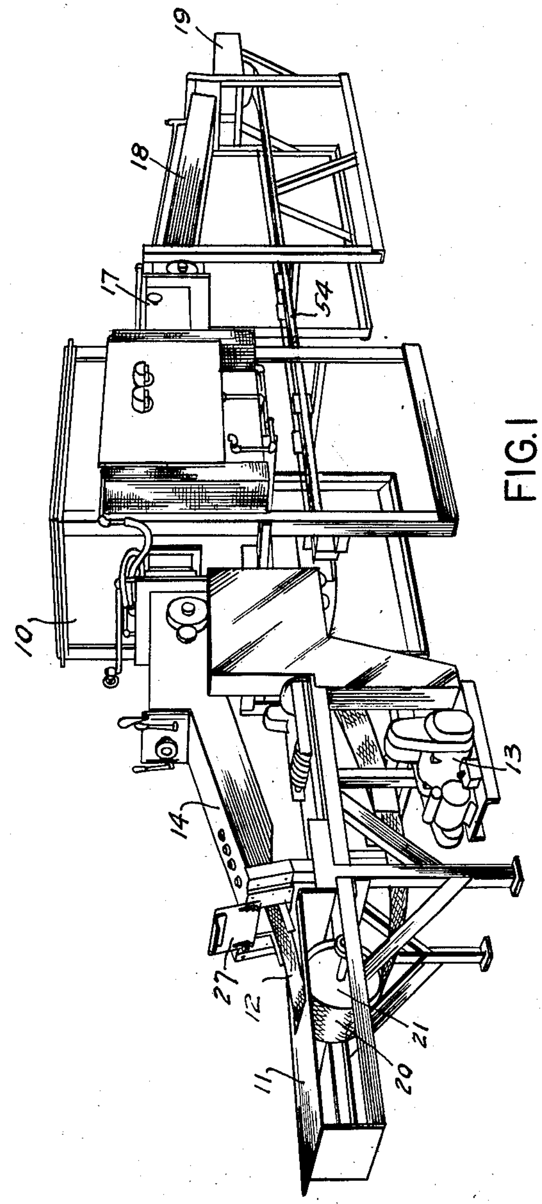
Fig. 1 is a perspective elevation of an illustrative muffle-type furnace embodying the invention.

Referring to the drawings, the high temperature furnace 10, see Fig. 1, has a leading platform 11 on which the work carrying trays are initially placed. The work is then moved along to the continuous conveyor belt 12 which is driven by the motor 13, through the ascending inlet passageway 14 and the throat 15 into the central high temperature heating chamber 16, which has a hydrogen atmosphere. The work is bright annealed in the central chamber as it moves along slowly on the conveyor belt, through a horizontal cooling chamber 17, down through the descending exit passageway 18, which also cools the work, and out onto the work receiving platform 19.

Figure 2:
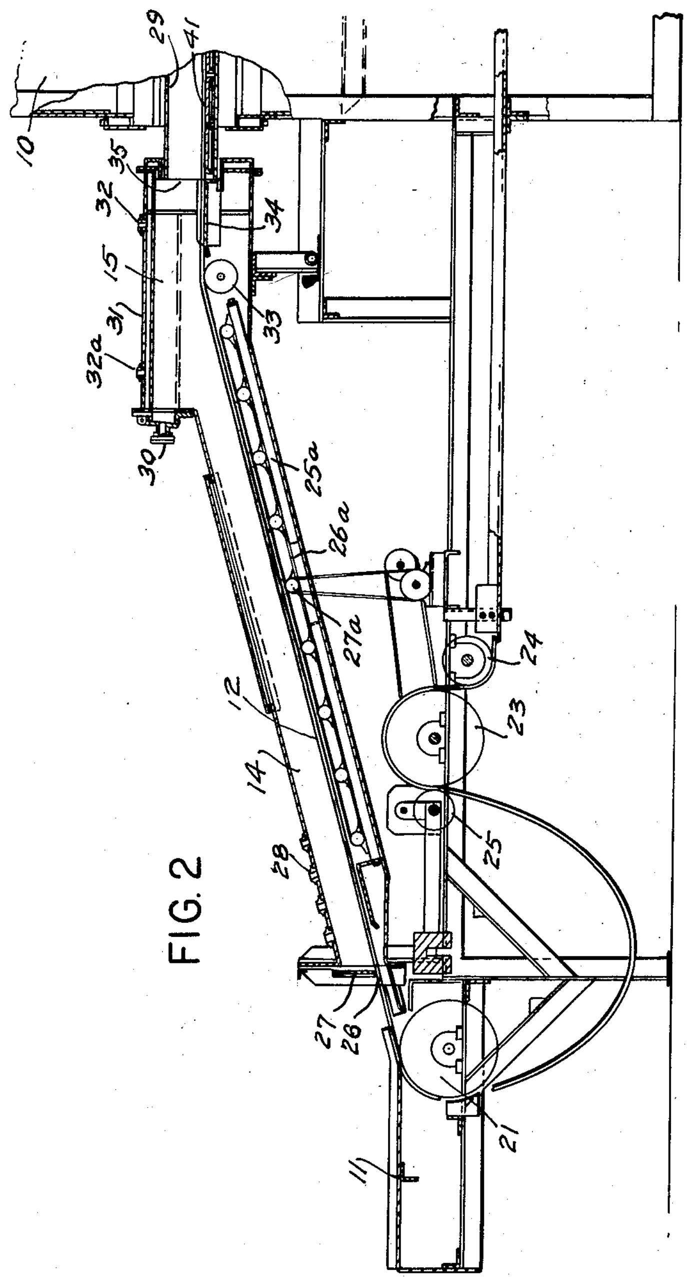
Fig. 2 is a vertical section through the inlet passageway of Fig. 1.

The conveyor belt 12, which carries work into the heating chamber, is made of an alloy in flexible web formation as shown at 20 in Fig. 1 and is continuous, extending over a rotatable drum 21 at the forward end of the furnace and over a rotatable drum 22 at the rear end of the furnace. The belt is moved forward by a friction drum 23, see Fig. 2, which is driven by the motor 13, directional changing roll 24 and pressure roll 25 facilitating pull on the conveyor belt by keeping the belt evenly stretched on the drum 23, the belt being slack between drums 23 and 21. Since high temperature on the alloy belt causes a weakening in the tensile strength of the belt at the portion subjected to the high heat of the heating chamber in its movement through the muffle, an auxiliary drive shown as **25*a* in Fig. 2 is positioned for the greater portion of the ascending passageway 14 which transmits a pushing motion to the conveyor belt in its upward climb to the elevated heating chamber 16 and thus reduces the tension in the hot belt. The auxiliary drive comprises an auxiliary belt 26*a* which literally carries the belt 12 through its ascending path, said belt 26*a* being driven by transversely extending shaft 27*a* which in turn is driven by motor 13** through suitable belts or sprocket chains.

The ascending passageway 14 is sealed against atmosphere air except for the entrance 26, through which the work conveying belt passes, and which may be closed by a slidable freely hinged door 27. Four gas outflow plugs 28 are positioned at the top forward end of the ascending passageway for a purpose hereinafter described.

The vestibule 15 of the heating chamber and the front end of the muffle 29 communicate with the upper end of the ascending passageway and has a peep-hole 30 at its upper forward end and a water jacket 31 around its upper portion for keeping the upper wall and the upper portions of the front side walls and the upper and same portion of side walls of the vestibule cool. Water plugs 32 and **32*a* in the jacket 31 provide for inflow and outflow of cooling water. A rotatable drum 33 within the vestibule forms a raised support for the conveyor as it reaches the maximum position of climb, the conveyor being guided into the muffle by a guide platform 34 positioned at the rear end of the vestibule and adjacent the entrance 35** to the muffle.

Figure 4:
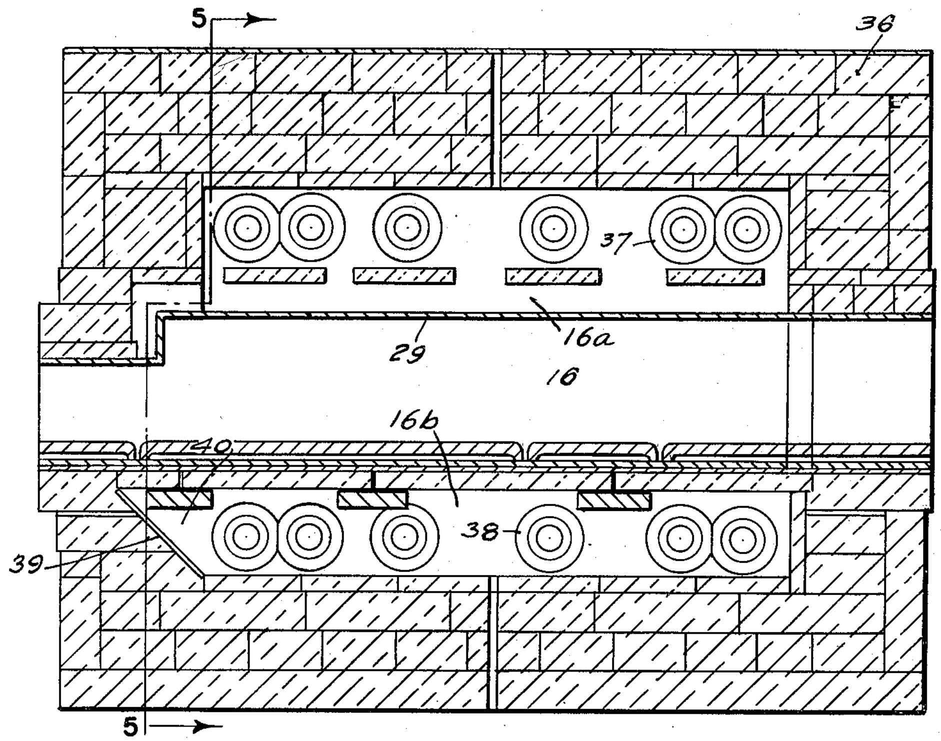
Fig. 4 is a vertical longitudinal section through the heating furnace.
Figure 5:
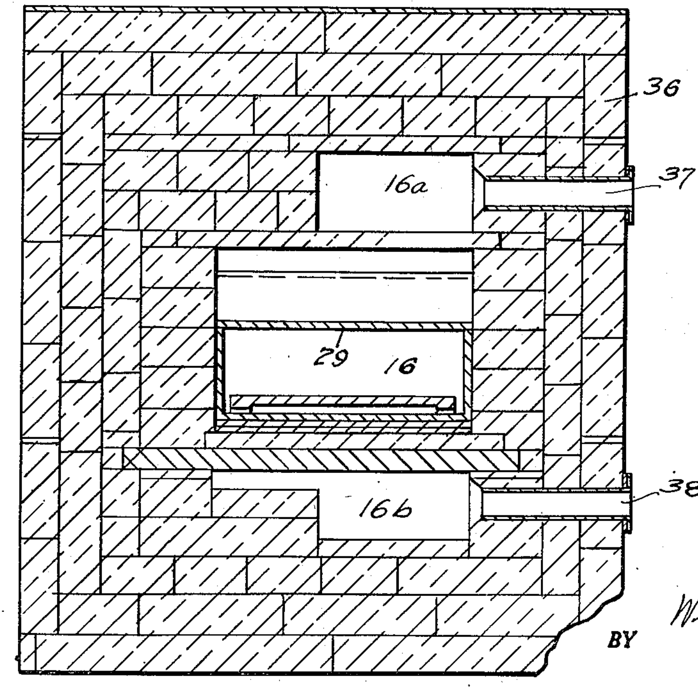
Fig. 5 is a section on the line 5—5 of Fig. 4.

The central heating chamber 16 consists of a fire brick housing 36, see Fig. 4, the muffle 29 being centrally located within the heating chamber and extending longitudinally therein and includes an upper recess **16*a* and a lower recess 16*b*. The walls of the muffle are heated by electrical heating units 37 seated in aluminum tubes 38 which are located above and below the muffle as shown in Figs. 4 and 5. The lower front wall 39 of the heating chamber is cut away at its forward end to provide a heat supplying extension 40 through which heat is directly supplied to the forward end of the muffle, whereby the front of the muffle does not suffer excessive heat change. The floor of the muffle is lined from one end to the other with case super hearth channels, shown as 41** in Fig. 2, over which the conveyor belt carries the work through the muffle, whereby a free circulation of heated atmosphere over the muffle floor and the work is obtained.

The horizontal cooling chamber 17 is in alignment with the rear end of the muffle, and has a water jacket 42 with water inlet ports 43 and **43*a* and an outlet port 44 and has additional channels 41 aligned with the muffle channels and lining the length of the floor. The rear end 45 of the horizontal cooling chamber is recessed to accommodate a rotatable drum 46** for changing the conveyor belt from a level position to a descending position.

The descending passageway 18 is sealed to atmospheric air except for the exit 47, through which the work conveyor belt passes and which may be closed by means of a free hinged slidable door 48. The passageway has a water jacket 49 with inlet ports 50 and outlet ports **50*a* at the top of the passageway, and an auxiliary atmospheric inlet 51 and water drain 51*a* at the bottom of the passageway. A hydrogen directional atmosphere injector 52 is located on the top of the passageway 18** adjacent the forward end thereof for supplying a continuous adjustable directional flow of hydrogen atmosphere to the muffle.

By adjusting of the effective heights of the end openings to obtain a desired pressure differential, the hydrogen atmosphere flows towards the front of the furnace, the plugs at 28 in the ascending passageway being used to control the rate of flow in this direction by the simple expedient of removing one or more of the plugs. These plugs are also used to remove contaminated hydrogen by providing a flow from the injector to force out the contaminated atmosphere through the plug openings.

Outflow ports 53 are provided at the rear end of the descending passageway 18 to clear the passageway of any hydrogen and air mixture which may develop due to seepage of air from the outside through the exit opening 47, and adjust the effective height relationship between front and rear ends of openings and exits.

Figure 3:
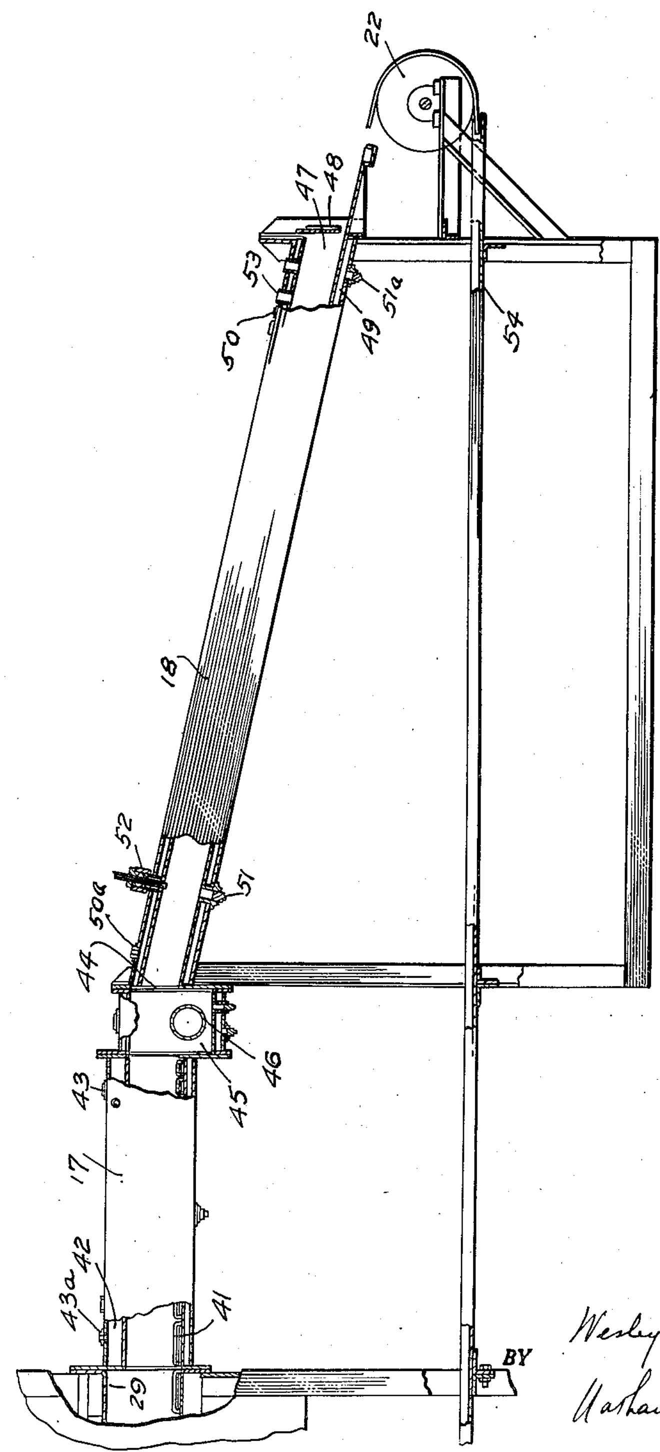
Fig. 3 is a partial vertical section through the exit passageway of Fig. 1.

The bright annealed work is received at the platform 19 at the rear end of the furnace, and the conveyor belt returns to the forward end of the furnace on a support 54 as shown in Fig. 3.

It is now evident that trays containing metal material to be annealed are placed on the ascending conveyor belt to pass into the throat of the heating chamber and through the muffle over the muffle protecting platforms. Prior to introduction of the work, the muffle is filled with hydrogen atmosphere under slight pressure by means of the atmosphere injector at the rear of the furnace; the muffle is then continuously supplied with hydrogen atmosphere during its operation by a regulatable flow of hydrogen; due to the elevated differential of the work entrance and exit openings, the hydrogen under slight pressure forms pressure curtains at opposite ends of the heating chamber to seal out any seepage of air into the muffle while maintaining the maximum utilization of the hydrogen under relatively low pressure conditions. The hydrogen gas slowly flows towards the front end, and as it becomes contaminated by cleansing action on the metal work, it is replenished by inflow of fresh hydrogen and escape of contaminated atmosphere through one or more of the escape port vents.

Warping of the front end of the muffle is prevented by the novel construction of the furnace, which includes a direct channeling of heat to the front portion of the muffle floor to impart heat more rapidly to the entrance than would otherwise be possible by conduction through the vertical furnace walls alone, and by keeping the incoming cold work from direct contact with the muffle floor. On leaving the heating chamber the annealed hot work passes through a series of cooling sections of the furnace before it descends towards the outlet to lower the temperature of the work below the ignition point of hydrogen air mixture, which forms at the outlet of the furnace due to seepage of air from the outside, whereby complete safety of the operation is assured.

Although I have described a specific constructional embodiment of my invention, it is clear that changes in the size, shape and arrangement of the parts may be made to suit different requirements, without departing from the spirit and the scope of the invention as defined in the appended claim.

I claim:

In a high temperature furnace having a heating chamber with a muffle, an enclosed ascending inlet passageway to the heating chamber, a horizontal cooling chamber connected to the rear end of the heating chamber, an enclosed descending outlet passageway from the cooling chamber, and a conveyor for conveying work through the inlet passageway, the heating chamber, the cooling chamber, and the outlet passageway, and means for supplying heat treatment atmosphere containing hydrogen to the furnace for enveloping the work to be heat treated comprising a directional injector at the upper end of the descending outlet passageway and outflow plugs at the upper end of the ascending inlet passageway and at the lower end of the descending outlet passageway, whereby inflow of said heat treatment atmosphere is directed through the descending passageway and through the heating chamber and the ascending passageway, said conveyor including a conveyor belt, a main drive for the belt, and an auxiliary drive including rollers in the ascending passageway for pushing the belt, whereby stretching of the belt is prevented.

References Cited in the file of this patent

UNITED STATES PATENTS

| | | |
|---|---|---|
| 1,678,876 | Rohn | July 31, 1928 |
| 2,057,518 | Fraser et al. | Oct. 13, 1936 |
| 2,061,910 | Kingston | Nov. 24, 1936 |
| 2,191,133 | Pearson | Feb. 20, 1940 |